United States Patent [19]
Scott

[11] 3,727,589
[45] Apr. 17, 1973

[54] ROTARY INTERNAL COMBUSTION ENGINE

[76] Inventor: Wilbert Milo Scott, 808 13th Avenue, West, Williston, N. Dak. 58801

[22] Filed: Aug. 12, 1971

[21] Appl. No.: 171,261

[52] U.S. Cl. .................................123/8.45, 418/260
[51] Int. Cl. ............................F01c 1/00, F02b 53/00
[58] Field of Search ....................123/8.45; 418/260, 418/261, 264, 265, 266, 268, 270, 112, 117

[56] References Cited

UNITED STATES PATENTS

| | | | |
|---|---|---|---|
| 2,345,561 | 4/1944 | Allen | 123/8.45 |
| 2,048,825 | 7/1936 | Smelser | 128/8.27 |
| 3,250,260 | 5/1966 | Heydrich | 123/8.45 |
| 3,548,790 | 12/1970 | Pitts | 123/8.45 |

FOREIGN PATENTS OR APPLICATIONS 1,316,358  12/1962  France ...............................123/8.45

Primary Examiner—Carlton R. Croyle
Assistant Examiner—Michael Koczo, Jr.
Attorney—Merchant & Gould

[57] ABSTRACT

A rotary internal combustion engine including a housing having a generally oval inner peripheral wall surface slidingly engaged by vanes radially slidably carried by a cylindrical rotor. The rotor includes a main rotor body and circumferential end flanges projecting radially from opposite ends of the body, the end flanges having radial grooves supporting the opposite ends of the vanes. The vanes operatively engage cam tracks in the housing to keep the vanes substantially in engagement with the generally oval inner wall surface during rotation of the rotor. The rotor cooperates with the housing to define a plurality of chambers, the number of chambers and the number of power impulses of the engine per revolution of the rotor equaling the number of vanes on the rotor.

3 Claims, 6 Drawing Figures

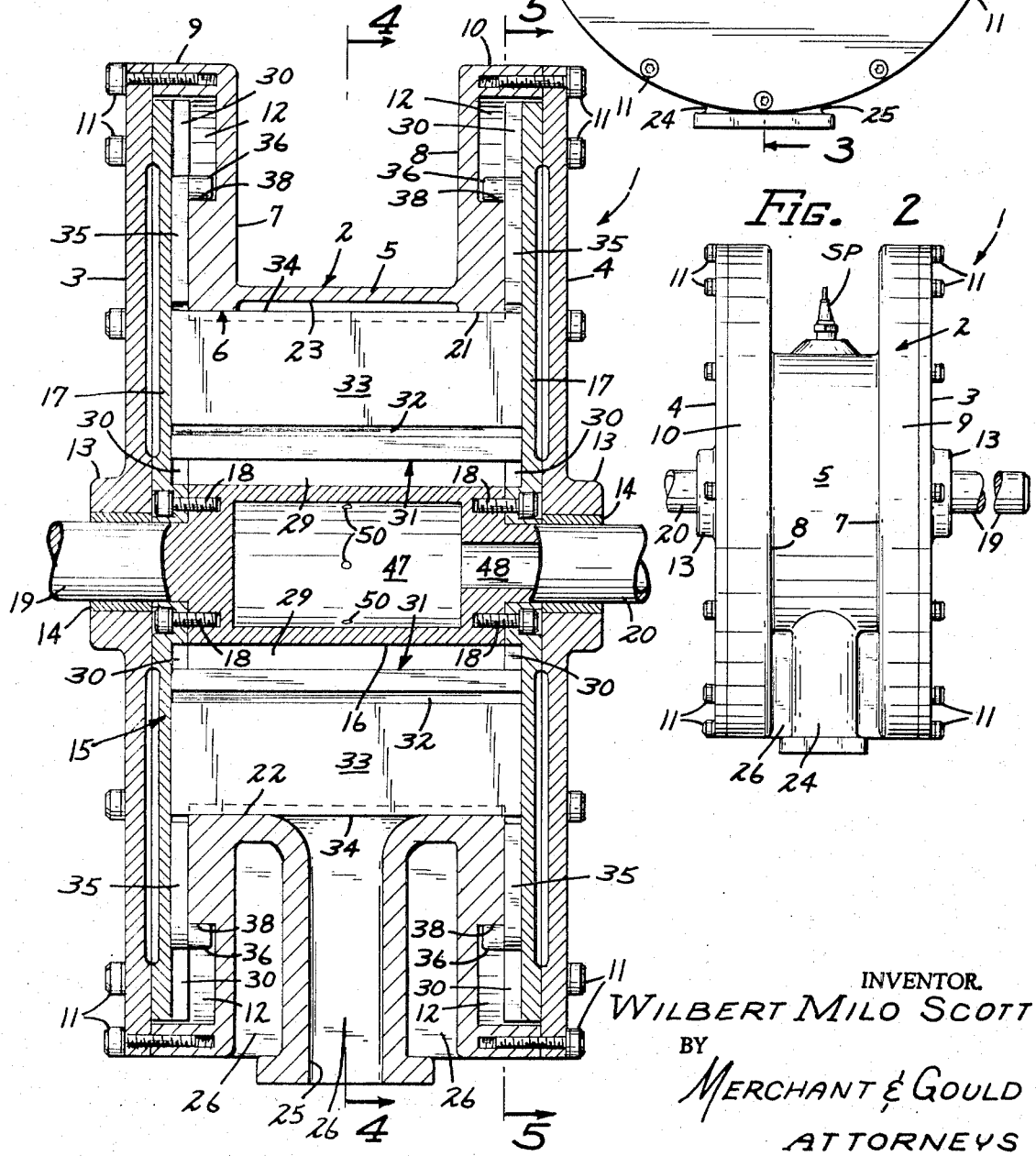

INVENTOR.
WILBERT MILO SCOTT
BY
MERCHANT & GOULD
ATTORNEYS

3,727,589

ROTARY INTERNAL COMBUSTION ENGINE

SUMMARY OF THE INVENTION

An important object of this invention is the provision of a rotary internal combustion engine which is smooth in operation, and which has a minimum of moving parts.

Another object of this invention is the provision of an engine having a rotor equipped with circumferentially spaced radial vanes and of novel means for supporting the vanes for radial sliding movement during rotation of the rotor.

Another object of this invention is the provision of a cam arrangement for holding the vanes substantially in operative engagement with an inner peripheral wall surface of the engine housing at all times.

To the above ends, I provide an engine housing having a peripheral wall and opposite end walls, the peripheral wall having an inner generally oval wall surface. A rotor is disposed in the housing, the rotor including a generally cylindrical rotor body, radially outwardly projecting circumferential flanges at opposite ends of the body, and an axial shaft journaled in the end walls of the housing. The rotor body is provided with circumferentially spaced radially outwardly opening grooves for radially sliding reception of vanes which operatively engage the generally oval wall surface. The rotor flanges have opposed radial channels registering with the rotor body grooves for reception of the opposite ends of the rotor vanes to support the vanes during their sliding movement relative to the rotor. The housing defines a pair of cam tracks engaged by cam follower elements on the radial vanes to maintain the vanes operatively in engagement with the generally oval wall surface. The generally oval wall surface has diametrically opposed portions disposed in close proximity to the cylindrical surface of the rotor body to define therewith generally crescent shaped inlet and exhaust chambers each divided into a plurality of subchambers by the vanes in each one of the chambers. The housing further defines an inlet passage at one side of one of the chambers and an exhaust passage at the adjacent side of the other chamber, in close proximity to the inlet passage. One of the opposed wall portions opposite the inlet and outlet passages is formed to provide a restricted gas transfer passage between the compression and expansion chambers.

DESCRIPTION OF THE DRAWINGS

FIG. 1 is a view in end elevation of a rotary internal combustion engine produced in accordance with this invention;

FIG. 2 is a view in side elevation of the engine of FIG. 1, some parts being broken away;

FIG. 3 is an enlarged axial section taken on line 3—3 of FIG. 1;

DETAILED DESCRIPTION OF THE PREFERRED EMBODIMENT

Figure 4:
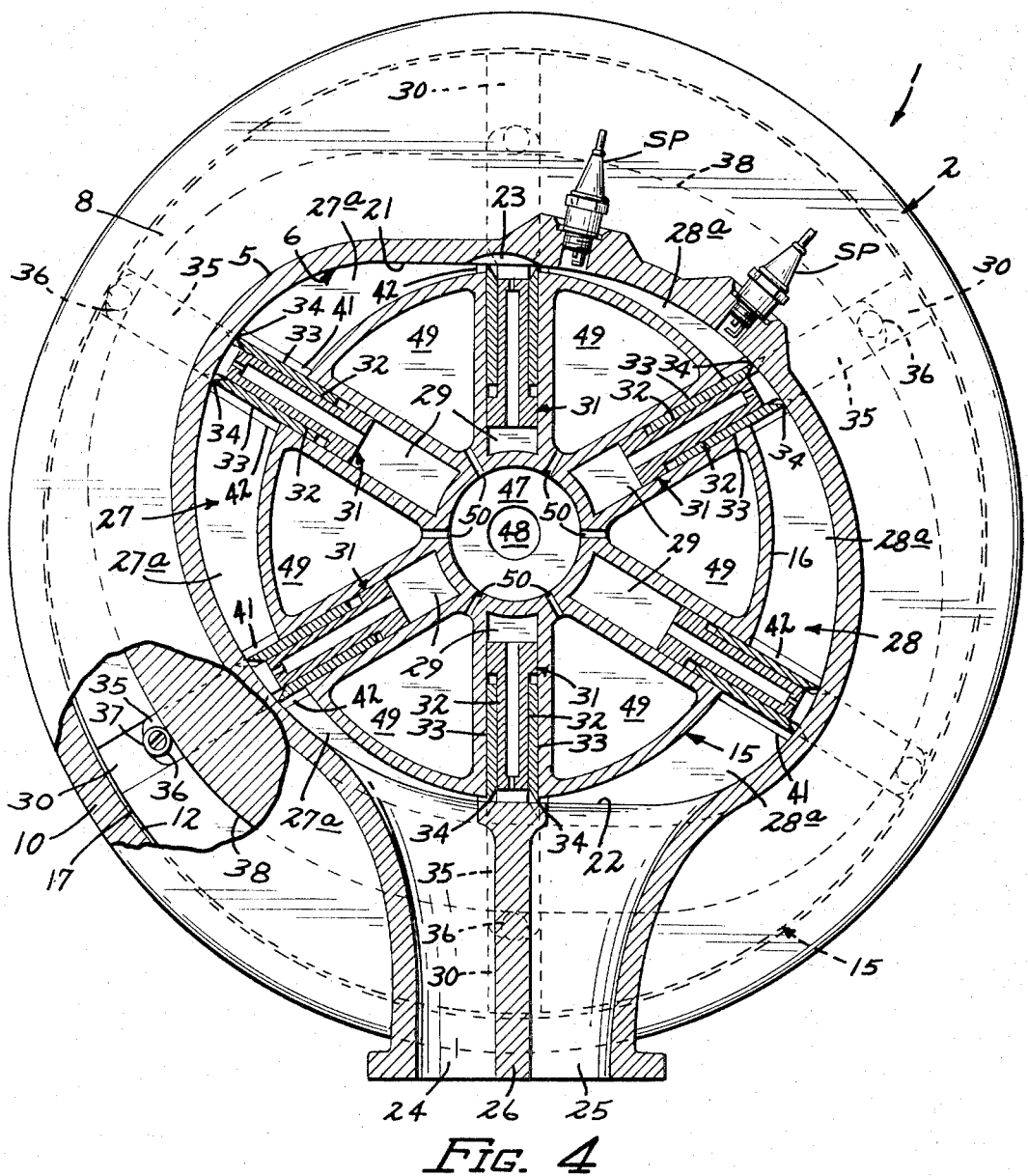
FIGS. 4 and 5 are transverse sections taken on the lines 4—4 and 5—5 respectively, of FIG. 3.

The motor of this invention comprises a generally cylindrical housing, indicated generally at 1, and including a generally central wall section 2 and a pair of axially spaced generally circular end walls 3 and 4. The central wall section 2 includes a peripheral wall 5 defining a cross-sectionally generally oval inner wall surface 6, and a pair of axially spaced radial wall portions 7 and 8 the radially outer edges of which are formed in the nature of circumferentially extending axial flanges 9 and 10 respectively. The flanges 9 and 10 have abutting engagement with the end walls 3 and 4 respectively, the end walls 3 and 4 being rigidly secured to the flanges 9 and 10 by circumferentially spaced machine screws 11. The radial wall portions 7 and 8, axial flanges 9 and 10, and end wall 3 and 4 cooperate to define annular chamber portions 12, the end walls 3 and 4 being provided at their central portions with bosses 13 in which are mounted axially aligned bearings 14.

A rotor, indicated generally at 15, is disposed within the housing 2, and comprises a cylindrical rotor body 16, a pair of annular end plates providing axially spaced flanges 17 secured to the rotor body portion 16 by machine screws 18, and axial shaft portions 19 and 20 each journaled in a different one of the bearings 14. With reference to FIG. 3, it will be seen that the radially outer portions of the end flanges 17 are each disposed in a different one of the annular chamber portions 12, for rotation therein.

Figure 5:
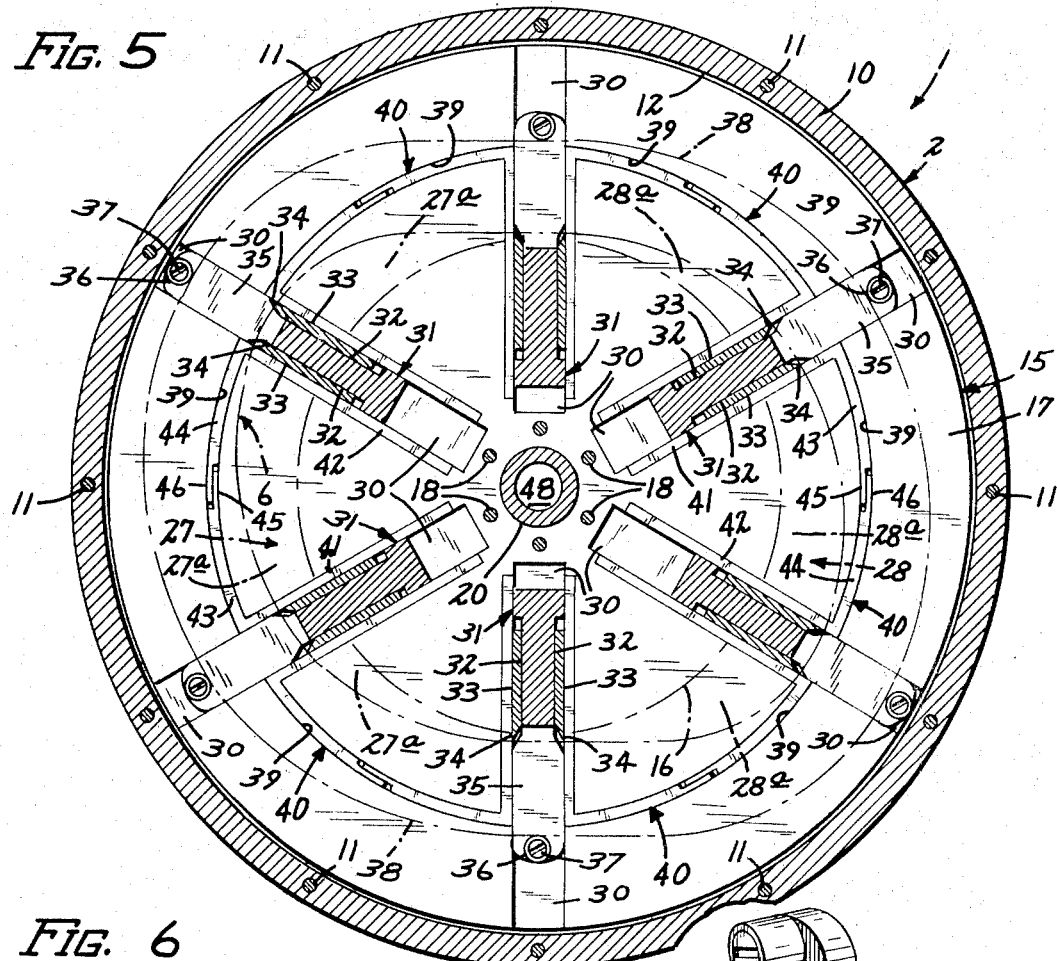
Figure 6:
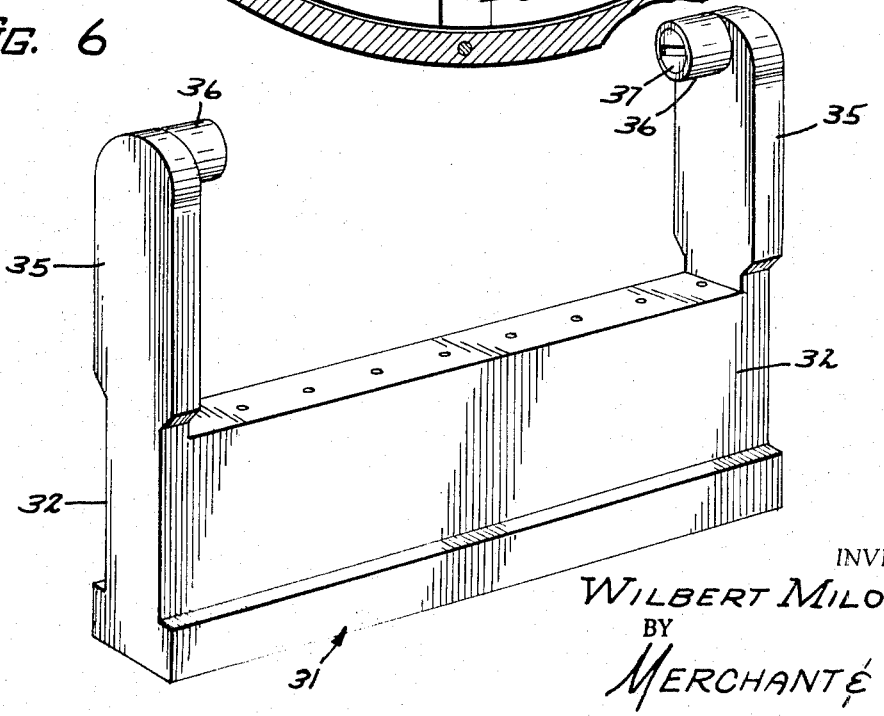
FIG. 6 is an enlarged view in perspective of one of the rotor vanes of this invention.

With reference to FIG. 4, it will be seen that the inner generally oval surface 6 of the peripheral wall 5 is formed to provide generally flattened upper and lower surface portions 21 and 22 respectively that are disposed in very close proximity to adjacent surface portions of the rotor body 16. Directly above the axis of the rotor 15, the wall surface portion 21 is formed to provide a downwardly opening transfer cavity 23, the purpose of which will hereinafter become apparent. The central wall section 2 is formed to provide a gas inlet passage 24 and an outlet passage 25, separated by a partition 26, substantially diametrically opposite the transfer cavity 23. The rotor 15 is disposed to rotate in a clockwise direction with respect to FIGS. 4 and 5, the rotor 15 cooperating with the housing 1 to define crescent shaped compression and expansion chambers 27 and 28 respectively, the compression chamber 27 communicating with the inlet passage 24, the expansion chamber 28 communicating with the outlet or discharge passage 25, see FIG. 4.

The rotor body portion 16 is formed to provide a plurality of circumferentially spaced radially outwardly opening grooves 29 that extend axially of the rotor body 16 and which register with opposed radially extending grooves 30 in the end flanges 17. It will be noted that the grooves 30 extend radially to the radially outer edges of their respective end flanges 17. A plurality of vanes 31 are slidably mounted one each in a different one of the radial grooves 29, the opposite ends of the vanes 31 being disposed in opposed grooves 30 in the end flanges 17. Each vane 31 is formed to provide circumferentially spaced parallel flat side portions 32 which slidably engage a pair of plate-like seal elements 33 that are co-extensive in axial length with their respective vanes 31, the opposite ends of each seal element 33 being disposed in the radial grooves 30 in the end flanges 17. As shown particularly in FIGS. 4 and 5, the seal elements 33 have bevelled radially outer edges 34 that are adapted to slidably engage the generally oval inner surface 6 of the peripheral wall 5. Further, each vane 31 is formed at its axially opposite ends with radially outwardly extending arms 35 having axially aligned cam follower rollers 36 journaled thereon by means of pivot screws or the like 37. The radial wall portions 7 and 8, within their respective annular chambers 12, are formed to provide indentical cam tracks 38 each having a shape corresponding to that of the inner oval surface 6 of the peripheral housing wall 5, and each being spaced radially outwardly from the inner wall surface 6 equidistantly at all points about its length. With this arrangement, the vanes 31, together with their respective seal elements 33 are maintained in radially projected positions wherein the bevelled edges 34 of the seal elements are held in very close proximity to the wall surface 6 if not actually in sliding contact therewith when the rotor 15 is stationary or when rotating at relatively low cranking speed. In the embodiment of the invention illustrated, the vanes 31 are shown as being six in number, although it will be appreciated that any desired number of vanes 31 may be used. The vanes 31 divide the chambers 27 and 28 into subchambers or chamber portions 27a and 28a which, during rotation of the rotor 15 in a clockwise direction with respect to FIGS. 4 and 5, alternately expand and contract. The chambers 27a expand when moving past the inlet passage 24, whereby to draw combustible gases thereinto, and contract when approaching the transfer passage 23 whereby to highly compress the gases therein. As each chamber portion 27a passes the transfer passage or cavity 23 it becomes an expanding chamber portion 28a. The transfer passage 23 affords quick transfer of gases from a rapidly contracting chamber 27a to the adjacent expanding chamber 28a and eases, to some extent, the load of compressing gases on the vanes 31 in the direction opposite the direction of rotation of the rotor 15. Just beyond the transfer cavity 23 in the direction of rotation of the rotor 15, one or more conventional spark plugs SP are mounted in the peripheral wall 5 to ignite the gases in the uppermost one of the expansion chambers 28a at a given optimum timing. Preferably, the ignition occurs just as the transfer cavity 23 becomes sealed off from the uppermost expansion chamber portion 28a, as shown in FIG. 4. As occurs in any internal combustion engine, ignition of the gases causes very rapid expansion thereof, imparting rotation to the rotor 15. It will be noted that each expansion chamber portion 28a expands as it approaches the outlet or discharge passage 25. As soon as it is exposed to the outlet passage 25, each expansion portion 28a rapidly contracts to force all of the gases of combustion outwardly through the passage 25. Then, while passing the partition 26, each expansion chamber 28a becomes an expanding compression chamber portion 27a.

The end flanges 17 are formed to define opposed circumferentially extending channels 39 each interconnecting circumferentially adjacent ones of the radial grooves 30. Each of the radial grooves 30 have a greater width radially inwardly of the channels 39 than radially outwardly thereof, see particularly FIG. 5. The channels 39 are equal in axial depth to the grooves 30 and, together with the portions of the grooves 30 radially inwardly thereof, are provided with seals 40. Each seal 40 comprises a pair of generally L-shaped sections 41 and 42 having arcuate legs 43 and 44 respectively, contained within the channels 39. The arcuate legs 43 and 44 terminate in overlapping foot portions 45 and 46 respectively, see FIG. 5. It will be noted that the channels 39 and seal portions contained therein are all disposed radially outwardly of the generally oval inner wall surface 6, and radially inwardly of the cam tracks 38, these together with the outline of the rotor body portion 16 being shown by broken lines in FIG. 5. The seals 40 may be made from any suitable material such as metal or plastic material, and are effective in preventing escape of gases under compression from the several chambers 27a and 28a to the annular chamber portions 12.

In the embodiment of the engine illustrated, the central portion of the rotor body 16 is formed to provide a chamber 47 that communicates with the exterior of the engine through an axial passage 48 in the rotor shaft portion 20. As shown in FIG. 4, the rotor body 16 is also provided with chambers 49 intermediate the radial grooves 29, each of the chambers 49 communicating with the central chamber 47 by means of radial passages 50. By this means, liquid or gaseous coolant may be applied to the chambers 49 to cool the rotor 16 during operation of the engine. Although not shown, it may be assumed that the peripheral wall 5 of the housing may be formed to provide a water jacket for cooling, or other well-known cooling means may be provided for the peripheral wall 5 and any other portion of the engine which may require special cooling.

It will be appreciated, that by having as many power impulses per rotation of the rotor 15 as there are vanes 31, and by having the expansion of combustion gases exerting pressure in the direction of rotation of the rotor, a highly efficient and smooth operating engine can be produced. Use of the cam tracks 38 and cam followers 36 provides for maintaining the plate-like seal elements 33 close to contact with the inner wall surface 6 at all times, so that centrifugal force alone is not needed to bring the seal elements 33 substantially into sealing contact with the wall surface 6. Further, by supporting the opposite ends of the vanes 31 and seal elements 33 as well as the radially inner portions thereof, the vanes and seal elements may be made of lighter weight materials of less thickness than would be necessary if the opposite ends were not supported during operation of the engine.

While I have shown and described a preferred embodiment of a rotary internal combustion engine, it will be appreciated that the same is capable of modification without departure from the spirit and scope of the invention, as defined in the claims.

I claim:

1. A rotary internal combustion engine comprising:
   a. a housing having wall means including a peripheral wall and a pair of opposed end walls, said peripheral wall having a cross-sectionally generally oval surface;
   b. a rotor disposed for rotation in said housing and comprising a generally cylindrical body portion, circumferential flanges projecting radially from opposite ends of said body portion, and a shaft extending axially from said body portion and journaled in at least one of said end walls;

c. said peripheral wall having generally diametrically opposed inner surface portions cooperating with said body portion and with said flanges to define a pair of substantially diametrically opposed generally crescent shaped compression and expansion chambers;

d. said housing defining an inlet opening to said compression chamber and an outlet opening to said expansion chamber in closely spaced proximity to said inlet opening;

e. said rotor body portion defining a plurality of circumferentially spaced radial grooves;

f. said flanges having opposed radially extending grooves registering with the grooves in said body portions and extending radially outwardly from said body portion;

g. a plurality of vanes one each slidably mounted in a different one of said body portion grooves and each having opposite end portions radially slidable in the registering grooves of said flanges, each of said vanes comprising a main body portion having generally flat opposite side wall surface portions, and a pair of plate-like seal elements each disposed in face-to-face sliding engagement with a different one of said side wall surface portions and said rotor body grooves, said seal elements having opposite ends radially slidably disposed in respective ones of the radially extending grooves in said flanges;

h. said housing having a portion defining a pair of cam tracks each disposed adjacent a different one of said rotor flanges radially outwardly of said generally oval surface, said cam tracks corresponding in shape to that of said generally oval inner surface;

i. said vanes each having cam follower elements engaging said cam tracks to hold the vanes operatively in engagement with said inner surface.

2. The engine defined in claim 1 in which one of the said diametrically opposed inner surface portions is disposed between said inlet and outlet openings, the other of said inner surface portions defining a radially inwardly opening cavity for transfer of gases from said compression chamber to said expansion chamber during rotation of said rotor, and a fuel igniter element in said expansion chamber circumferentially spaced from said cavity.

3. The engine defined in claim 1 in which said rotor flanges define opposed circumferentially extending channels each interconnecting the radial grooves of their respective flange, and in further combination with seals having portions in said radial grooves and other portions in said channels, the portions in said radial grooves having face-to-face sliding engagement with said seal elements, said portions in said channels slidably engaging said wall means radially outwardly with respect to said generally oval surface.

* * * * *